United States Patent
Yamagishi et al.

(10) Patent No.: US 7,122,930 B2
(45) Date of Patent: Oct. 17, 2006

(54) ELECTRIC MOTOR

(75) Inventors: Yoshihiko Yamagishi, Wako (JP);
Yoshihisa Hirose, Wako (JP)

(73) Assignee: Honda Motor Co., Ltd.(JP)

( * ) Notice: Subject to any disclaimer, the term of this patent is extended or adjusted under 35 U.S.C. 154(b) by 0 days.

(21) Appl. No.: 11/004,784

(22) Filed: Dec. 3, 2004

(65) Prior Publication Data

US 2005/0140235 A1 Jun. 30, 2005

(30) Foreign Application Priority Data

Dec. 26, 2003 (JP) .............................. 2003-433309

(51) Int. Cl.
*H02K 1/32* (2006.01)
*H02K 1/27* (2006.01)

(52) U.S. Cl. ........................... 310/156.53; 310/156.49; 310/156.56; 310/156.57; 310/58; 310/59; 310/52

(58) Field of Classification Search ........... 310/156.56, 310/156.46, 156.53, 156.57, 52, 58, 59
See application file for complete search history.

(56) References Cited

U.S. PATENT DOCUMENTS 5,666,015 A * 9/1997 Uchibori et al. ............ 310/261
5,679,995 A * 10/1997 Nagate et al. .......... 310/156.54
5,747,909 A * 5/1998 Syverson et al. ....... 310/156.56
5,760,520 A * 6/1998 Hasebe et al. .............. 310/261
5,811,904 A * 9/1998 Tajima et al. .......... 310/156.45
5,990,591 A * 11/1999 Yamaguchi et al. ... 310/156.53
6,147,428 A * 11/2000 Takezawa et al. ..... 310/156.57
6,445,100 B1 * 9/2002 Tajima et al. .......... 310/156.57
6,472,789 B1 * 10/2002 Akemakou ............. 310/156.57

FOREIGN PATENT DOCUMENTS

| JP | 01110035 | | 4/1989 |
| JP | 2000236639 A | * | 8/2000 |
| JP | 2003018775 A | * | 1/2003 |

\* cited by examiner

*Primary Examiner*—Darren Schuberg
*Assistant Examiner*—Yahveh Comas
(74) *Attorney, Agent, or Firm*—Adams & Wilks

(57) ABSTRACT

An electric motor including a stator with a plurality of coils wound around a ring-shaped iron core, and a rotor rotatably disposed inside the stator is provided. The rotor includes a rotor shaft and a yoke. The yoke is provided near its periphery with a plurality of plate-like permanent magnets arranged at equal pitches. Heat generated from the rotor is released through a plurality of air holes formed in the yoke between the rotor shaft and the permanent magnets.

9 Claims, 14 Drawing Sheets

(COMP. EXA.)

(EXA.)

ELECTRIC MOTOR

FIELD OF THE INVENTION

The present invention relates to an improvement in an electric motor and, more particularly, to an inner-rotor brushless motor.

BACKGROUND OF THE INVENTION

Such a brushless motor is generally comprised of a stator with a plurality of coils wound around an iron core, a rotor rotatably disposed inside the stator, and a housing containing the stator and the rotor. The housing is provided with a plurality of air holes so that heat generated from the rotor and the stator is released through the air holes.

A brushless motor having a cylindrical housing closed at its opposite ends with covers formed with air holes, and a rotor provided with a fan, is proposed in, e.g., Japanese Patent Laid-Open Publication No. HEI-1-110035. This brushless motor will be described in detail with reference to FIG. 15 hereof.

A brushless motor 300 shown in FIG. 15 includes a stator 303 formed by winding coils 302 around an iron core 301, a rotor 307 provided inside the stator 303 and consisting of a yoke 305 mounted on a rotor shaft 304 and a permanent magnet 306 mounted on the periphery of the yoke 305, and a cylindrical housing 308 containing the stator 303 and the rotor 307 together.

Opposite ends of the housing 308 are closed by covers 309, 309. One cover 309 is provided with a plurality of air inlet openings 310, and the other cover 309 is provided with a plurality of air outlet openings 311.

A fan 312 is mounted on the rotor shaft 304 near the air inlet openings 310. The fan 312 is rotated by rotation of the rotor shaft 304, drawing air into the housing 308 through the air inlet openings 310.

Air drawn into the housing 308 cools the heated stator 303, and then is discharged from the air outlet openings 311.

In the above brushless motor 300, however, a central part of the rotor 307 is not directly cooled, causing the problem that heat persists in the central part of the rotor 307.

Also, in the above brushless motor 300, the cooling fan 312 is attached on the rotor shaft 304, thus increasing the moment of inertia of the rotor 307. Therefore, it is required to increase the rigidity of the housing 308 and the covers 309, 309 for supporting the rotor 307, disadvantageously leading to a weight increase of the brushless motor 300.

There is thus a desire for an art which allows heat in a central part of a rotor to be released, and also allows an electric motor to be reduced in weight.

SUMMARY OF THE INVENTION

According to an aspect of the present invention, there is provided an electric motor which comprises a stator with a plurality of coils wound around a ring-shaped iron core; and a rotor rotatably disposed inside the stator; the rotor comprising a rotor shaft; a yoke integrally mounted on the rotor shaft; a plurality of magnet holes formed at equal pitches near a periphery of the yoke; and a plurality of plate-like permanent magnets disposed in the magnet holes, respectively; wherein the yoke has a plurality of air holes for accelerating heat release of the rotor, between the rotor shaft and the permanent magnets.

Thus, in the electric motor of the present invention, the air holes for accelerating heat release of the rotor are formed in the yoke, between the rotor shaft and the permanent magnets, allowing heat in a central part of the rotor to be directly released. Also, the formation of the air holes leads to a reduced weight of the rotor. As a result, the moment of inertia of the rotor is reduced, and a member supporting the rotor can be reduced in rigidity, resulting in reduction in weight of the electric motor.

According to an embodiment of the present invention, with the center of the rotor shaft as C, one of the permanent magnets as M1, a point of intersection of a perpendicular line drawn from the center C to the permanent magnet M1 and the periphery of the yoke as P1, a permanent magnet adjacent to the permanent magnet M1 as M2, a point of intersection of a perpendicular line drawn from the center C to the permanent magnet M2 and the periphery of the yoke as P2, and a point of intersection where a radial line passing through the center C and a midpoint between the adjacent permanent magnets M1, M2 intersects with the periphery of the yoke as Q, when a circle of a radius r passing through the intersection point P1 and/or the intersection point P2 is drawn around the intersection point Q, the air holes are formed outside of the circle.

That is, since the air holes are formed in the yoke in locations outside of the circle, magnetic flux produced between the permanent magnets M1, M2 is not interrupted by the air holes. As a result, magnetic flux density can be prevented from being reduced.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

First, an exemplary snow removing machine equipped with electric motors according to the present invention will be described with reference to FIGS. 1 to 7.

Figure 1:
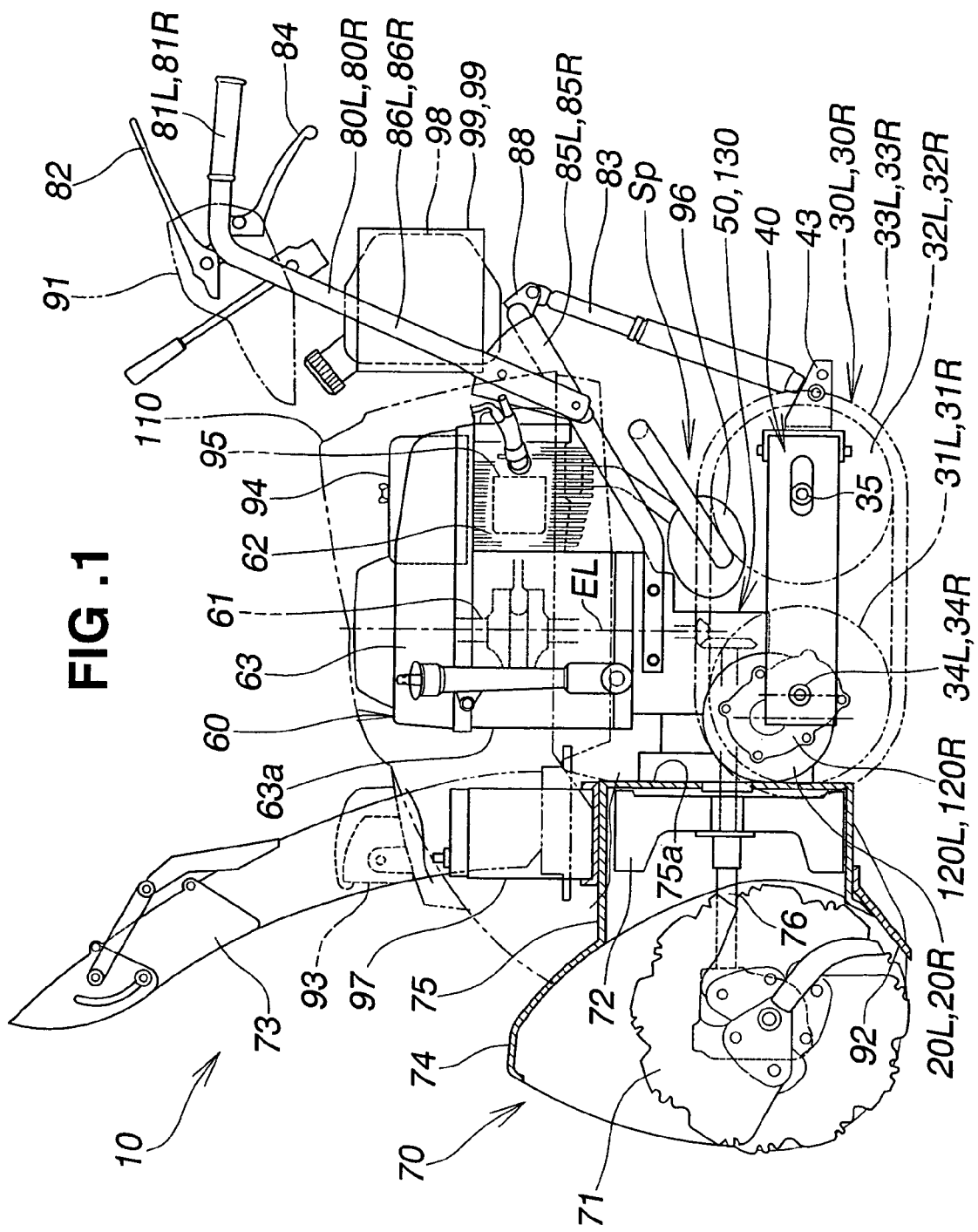
FIG. 1 is a side view illustrating the inside of a snow removing machine equipped with electric motors according to the present invention.
Figure 3:
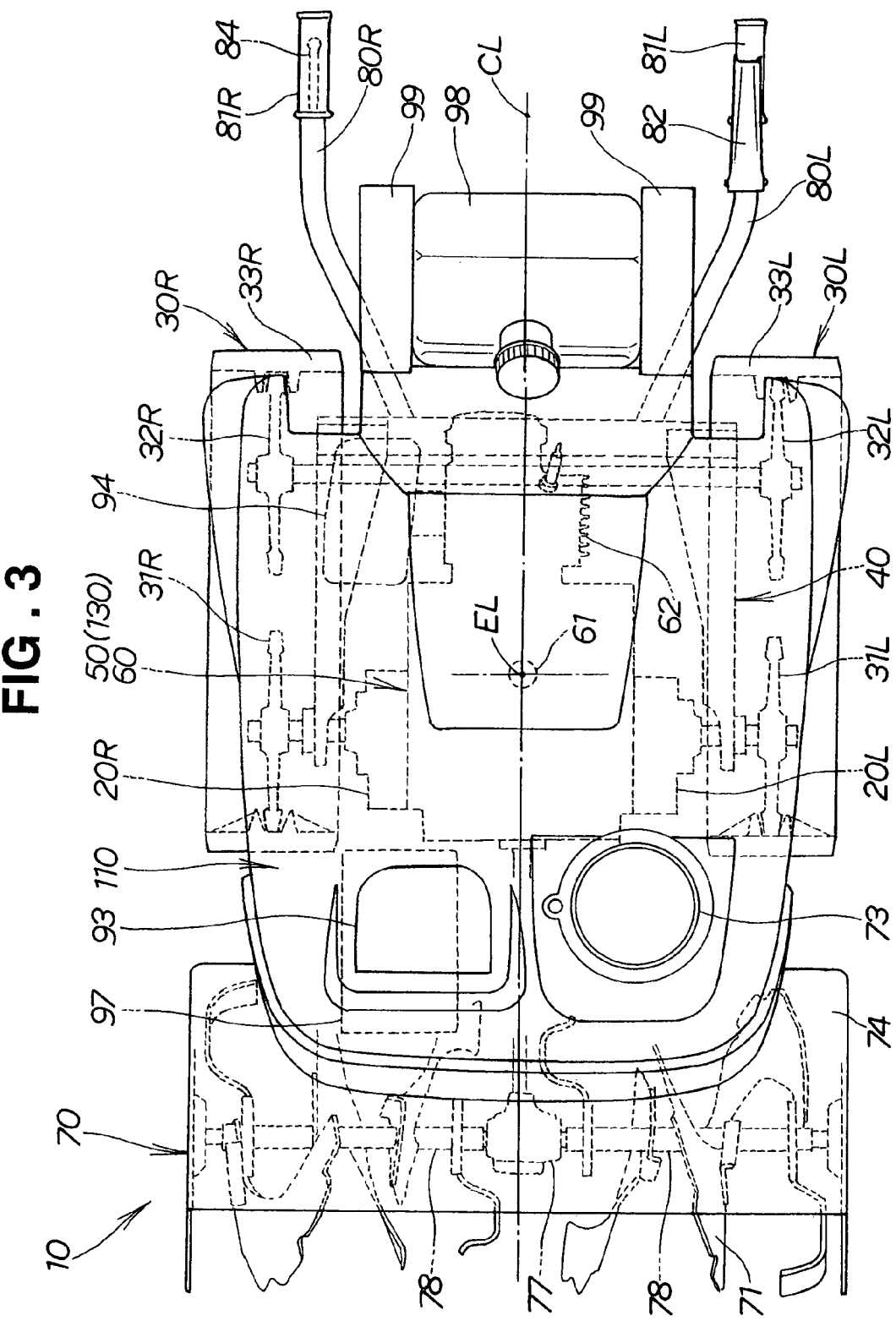
FIG. 3 is a plan view of the snow removing machine shown in FIG. 2.

A snow removing machine 10 shown in FIG. 1 includes a transmission case 50 doubling as a machine body, vertically swingably mounted to a crawler frame 40 having right and left travel units 30R, 30L (see FIG. 3).

Right and left electric motors 20R, 20L are mounted to the right and left sides of the transmission case 50. An engine 60 is mounted on top of the transmission case 50. A snow removing unit 70 is mounted to the front of the transmission case 50. Right and left operating handles 80R, 80L extend from upper portions of the transmission case 50 in a rearward and upward direction. An operating panel 91 is provided between the right and left operating handles 80R, 80L.

The snow removing machine 10 is a self-propelled, walk-behind working machine, which is led by an operator walking behind the operating panel 91.

The right and left operating handles 80R, 80L have grips 81R, 81L at their respective distal ends to be held in the hands of an operator.

The right and left electric motors 20R, 20L are travel driving sources, which transmit power to the right and left travel units 30R, 30L for driving via right and left travel transmission mechanisms 120R, 120L.

The right travel unit 30R is a crawler with a crawler belt 33R entrained around a front drive wheel 31R and a rear idle wheel 32R. The drive wheel 31R is rotated normally and reversely by the right electric motor 20R.

The left travel unit 30L is a crawler with a crawler belt 33L put around a front drive wheel 31L and a rear idle wheel 32L. The drive wheel 31L is rotated normally and reversely by the left electric motor 20L.

The engine 60 is a vertical engine with a crankshaft 61 extending downward, constituting an operation driving source to transmit power to the snow removing unit 70 for driving via an operation transmission mechanism 130 and a transmission shaft 76 housed in the transmission case 50.

The engine 60 has a cylinder 62 oriented rearward, and a front surface 63a of an engine body 63 housing the crankshaft 61 is adjacent to a rear surface 75a of the snow removing unit 70 (i.e., a rear surface 75a of a blower housing 75).

The snow removing unit 70 consists of a front auger 71, a rear blower 72, an upper chute 73, an auger housing 74 enclosing the auger 71, and the blower housing 75 enclosing the blower 72. The auger housing 74 and the rear blower housing 75 are integrally formed.

The auger 71 acts to collect snow accumulating on the ground to the center. The blower 72 receiving the snow throws the snow to a desired location around the snow removing machine 10 via the chute 73.

The snow removing machine 10 also includes a swing drive mechanism 83 for vertically swinging the transmission case 50. The swing drive mechanism 83 is constituted by a telescopic mechanism which vertically swings the transmission case 50 to adjust the height of the snow removing unit 70. The swing drive mechanism 83 is constituted by an actuator with a rod being able to project from and retract into a cylinder, such as an electric actuator, a hydraulic actuator, or a pneumatic actuator.

In FIG. 1, reference numeral 92 denotes a scraper; 93, a lamp; 94, an air cleaner; 95, a carburetor; and 96, an engine exhaust muffler.

Figure 2:
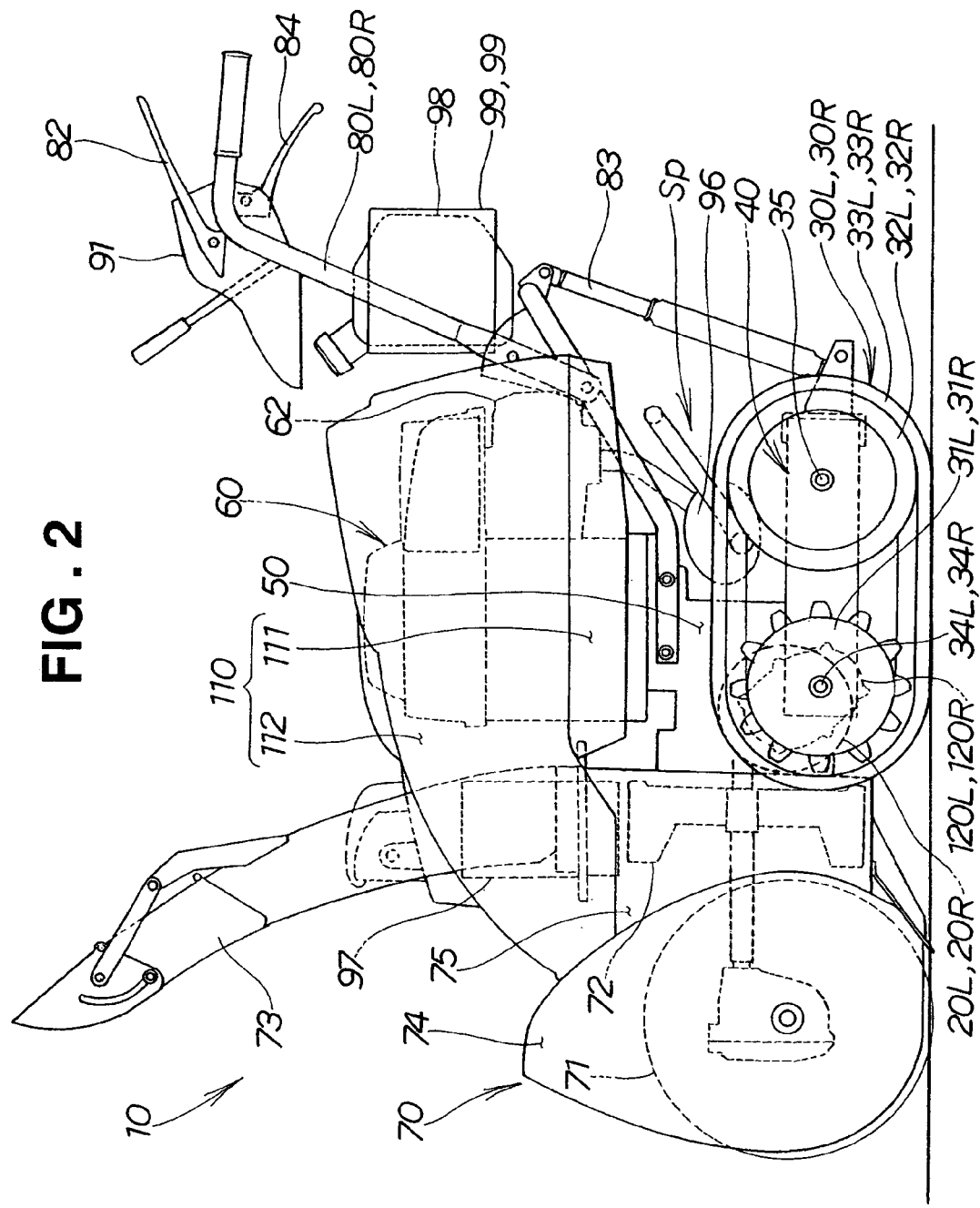
FIG. 2 is a side view of the snow removing machine equipped with the electric motors according to the present invention.

FIG. 2 shows the snow removing machine 10 with the engine 60 and the surrounding parts enclosed by a cover 110. The cover 110 consists of a lower cover portion 111 enclosing a lower half of the engine 60 and an upper cover portion 112 enclosing an upper half of the engine 60.

The engine 60 is disposed on the transmission case 50. The cylinder 62 of the engine 60 is oriented rearward, thereby to form a space Sp below the cylinder 62. The engine exhaust muffler 96 is disposed in the space Sp, generally surrounded by the transmission case 50 located in front of the engine exhaust muffler 96, the crawler frame 40, the right and left crawler belts 33R, 33L, and the engine 60. Therefore, an operator is prevented from directly touching the relatively hot engine exhaust muffler 96.

As shown in FIG. 3, the engine 60 is disposed in the substantially central part of the snow removing machine 10. The center EL of the crankshaft (engine output shaft) 61 is located on the vehicle longitudinal center line CL. As shown in FIG. 1, the transmission case 50 and the operation transmission mechanism 130 housed in the transmission case 50 are disposed directly below the engine 60. The snow removing unit 70 is disposed in front of the transmission case 50 and the operation transmission mechanism 130. The right and left travel units 30R, 30L are disposed on the right and left sides of the transmission case 50 and the operation transmission mechanism 130.

The right and left electric motors 20R, 20L as electric motors of the present invention are disposed between the right and left drive wheels 31R, 31L located in the front parts of the right and left travel units 30R, 30L.

The chute 73 is disposed at a left front portion of the snow removing machine 10, and the lamp 93 and a battery 97 are at a right front portion. The air cleaner 94 is disposed at a right rear portion of the snow removing machine 10. A fuel tank 98 is located in the rear of the snow removing machine 10 between the right and left operating handles 80R, 80L. Right and left motor drive controllers 99, 99 are mounted to the right and left sides of the fuel tank 98.

As shown in FIG. 1, the left operating handle 80L is provided near the grip 81L with a travel preparation lever 82 for making the right and left electric motors 20R, 20L drivable. The right operating handle 80R is provided near the grip 81R with an adjusting lever 84 for operating the swing drive mechanism 83.

Figure 4:
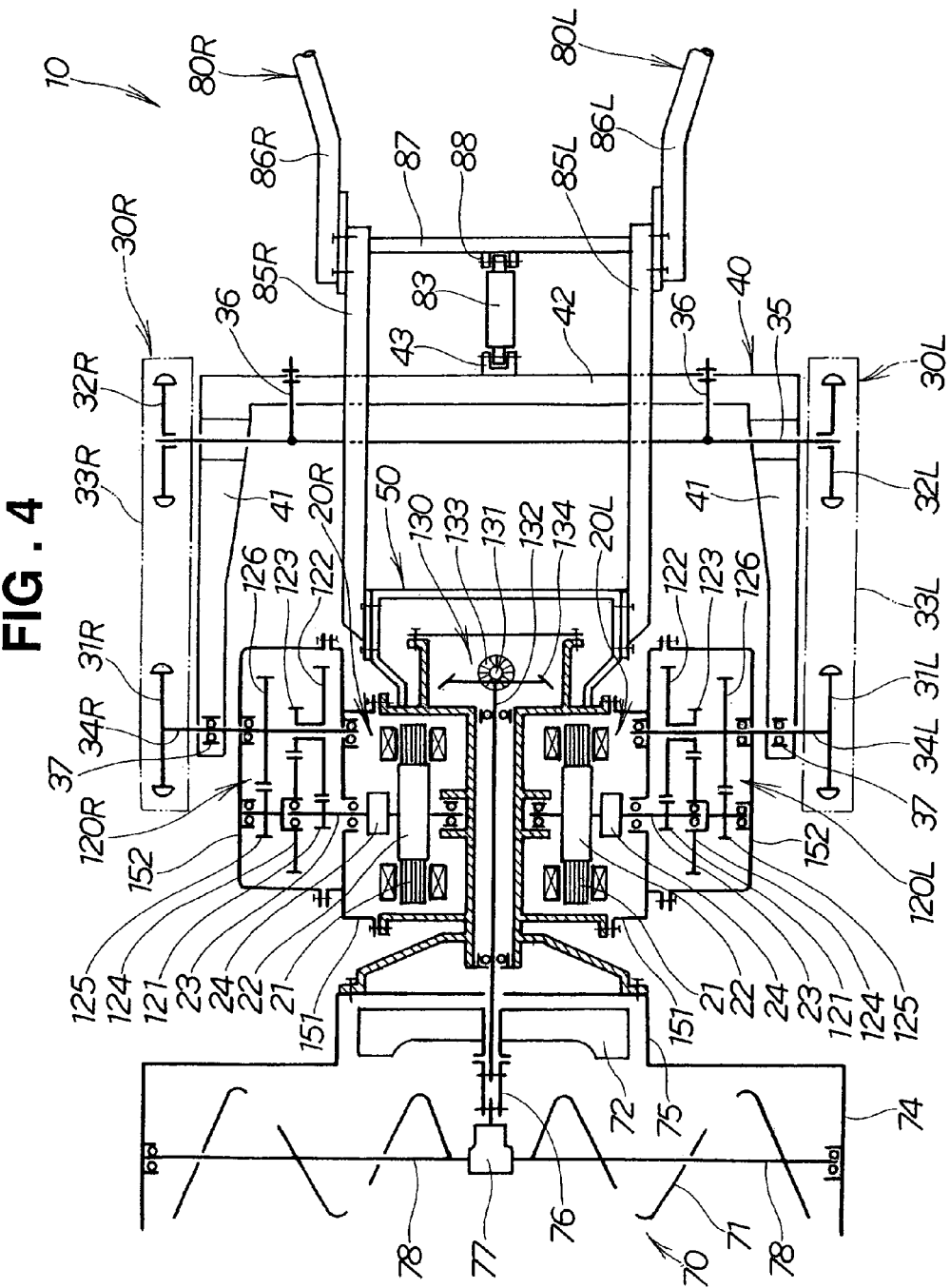
FIG. 4 is a schematic diagram of the snow removing machine, showing the electric motors of the present invention and reduction mechanisms.

As shown in FIG. 4, the transmission case 50 is disposed between the right and left travel units 30R, 30L.

Referring to FIG. 4, the crawler frame 40 is a substantially U-shaped member in a plan view, including a pair of right and left side members 41, 41 extending longitudinally of the snow removing machine 10, a crossmember 42 extended between the rear ends of the right and left side members 41, 41, and a bracket 43 mounted to a middle portion of the crossmember 42.

The right and left side members 41, 41 rotatably support right and left drive wheel axles 34R, 34L at their front portions, and support an idle wheel axle 35 at their rear portions. The right and left drive wheel axles 34R, 34L are rotary shafts to which the right and left drive wheels 31R, 31L are fixed. The right and left idle wheels 32R, 32L are rotatably mounted on opposite ends of the single idle wheel axle 35.

The crossmember 42 is configured to be able to move forward and backward for adjustment by right and left adjusting bolts 36, 36 extending rearward from the idle wheel axle 35. The adjusting bolts 36, 36 are adjusted forward or backward, thereby moving the idle wheel axle 35 forward or backward to adjust the tension of the right and left crawler belts 33R, 33L.

The left electric motor (electric motor) 20L includes an annular outer stator (stator) 21 at the stationary side, an inner rotor (rotor) 22 enclosed by the outer stator 21, and a motor shaft (rotor shaft) 23 integrally fitted in the inner rotor 22. An electromagnetic brake 24 is mounted on the motor shaft 23. The electromagnetic brake 24 is a brake corresponding to a parking brake of common vehicles.

The left travel transmission mechanism 120L is a three-speed reduction mechanism, including a first pinion 121 mounted on the motor shaft 23, a first gear 122 in mesh with the first pinion 121, rotatably mounted on the drive wheel axle 34L, a second pinion 123 integrally formed with the first gear 122, a second gear 124 in mesh with the second pinion 123, rotatably mounted on the motor shaft 23, a third pinion 125 integrally formed with the second gear 124, and a third gear 126 in mesh with the third pinion 125, mounted on the drive wheel axle 34L.

The gears 121 to 126 are spur gears. The right electric motor 20R has the same configuration as that of the left electric motor 20L. The right travel transmission mechanism 120R has the same configuration as that of the left travel transmission mechanism 120L. Reference numerals 37, 37 denote bearings for the right and left drive wheel axles 34R, 34L.

The operation transmission mechanism 130 housed in the transmission case 50 is a single reduction mechanism including an input shaft 131 extending nearly vertically, an output shaft 132 extending nearly horizontally, a driving small bevel gear 133 mounted on the input shaft 131, and a driven large bevel gear 134 mounted on the output shaft 132 to mesh with the small bevel gear 133.

The output shaft 132 extends forward from the transmission case 50 and is connected to the snow removing unit 70 via the transmission shaft 76. That is, the transmission shaft 76 is connected to the front end of the output shaft 132. The transmission shaft 76 is connected to auger shafts 78, 78 via a worm gear reduction mechanism 77, and is also connected to the blower 72.

Now, the configuration of the right and left operating handles 80R, 80L and the mounting structure of the swing drive mechanism 83 will be described.

The operating handles 80R, 80L include right and left handle bases 85R, 85L extending rearward from the right and left sides of the transmission case 50, and right and left handle bars 86R, 86L attached adjustably in mounting angle to the rear ends of the handle bases 85R, 85L and further extending rearward. A crossmember 87 is extended between the rear ends of the right and left handle bases 85R, 85L. A bracket 88 is mounted to a middle portion of the crossmember 87.

The swing drive mechanism 83 is connected between the bracket 43 provided at the crossmember 42 of the crawler frame 40 and the bracket 88 provided at the crossmember 87 of the right and left handle bases 85R, 85L.

The right and left drive wheel axles 34R, 34L supported by the crawler frame 40 are also rotatably supported by the transmission case 50. Therefore, the transmission case 50 is vertically swingable about the drive wheel axles 34R, 34L. That is, the transmission case 50 swings vertically (in a front and back direction of the FIG. 4 sheet) via the swing drive mechanism 83 and the right and left handle bases 85R, 85L.

As describe above, the engine 60 (see FIG. 1) and the snow removing unit 70 are mounted to the transmission case 50. Therefore, the engine 60 and the snow removing unit 70 are vertically swung with the transmission case 50, thereby to adjust the height of the snow removing unit 70.

Figure 5:
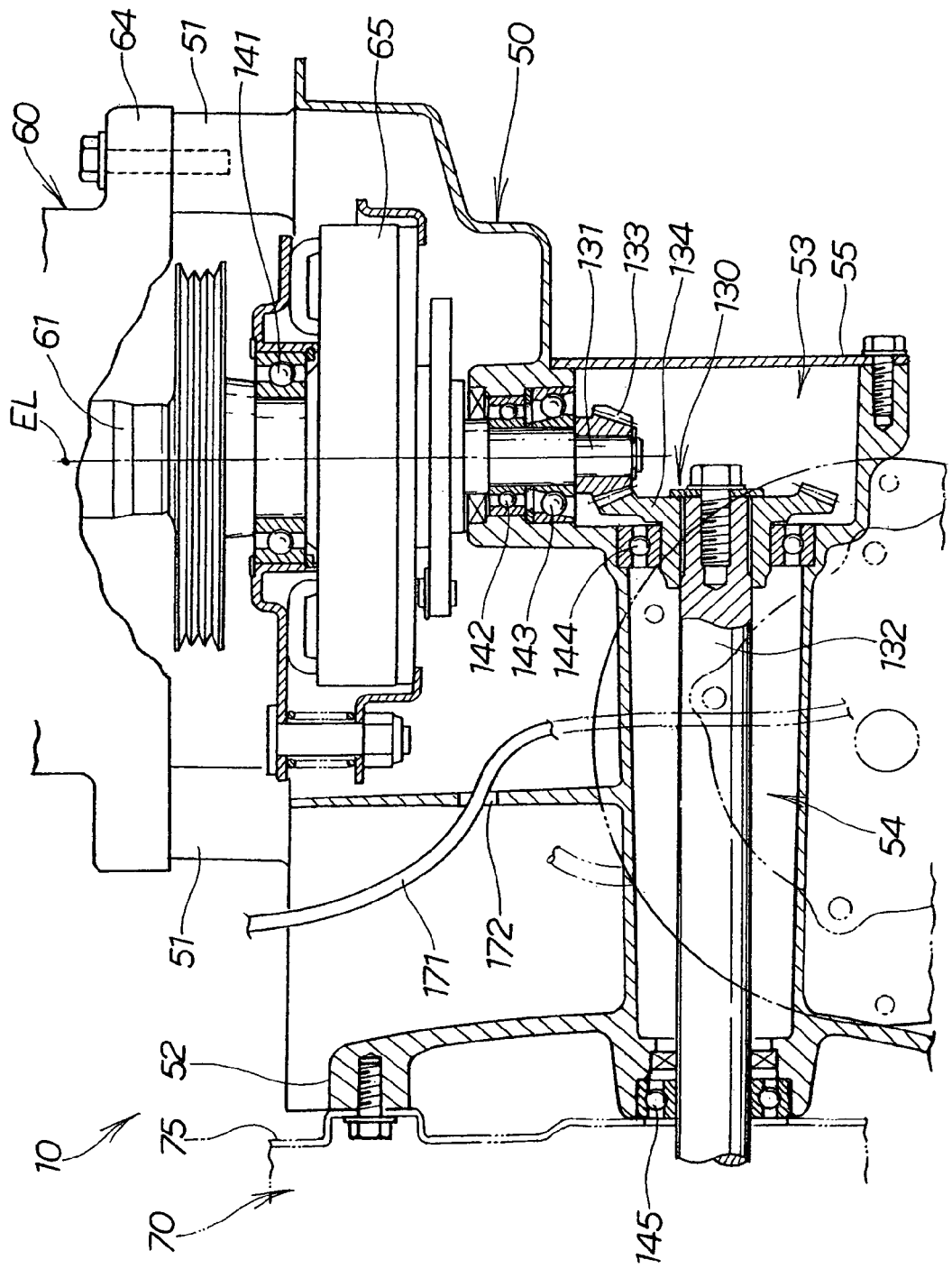
FIG. 5 is a cross-sectional view of a transmission case and an operation transmission mechanism of the snow removing machine.

FIG. 5 shows a cross section of the transmission case 50 and the operation transmission mechanism 130 of the snow removing machine shown in FIG. 1.

The transmission case 50 is provided at its top with a plurality of mounting bosses 51. A bottom portion 64 of the engine 60 is bolted to the mounting bosses 51 so as to mount the engine 60 on top of the transmission case 50. The transmission case 50 is provided at its front with a mounting flange 52. The blower housing 75 is bolted to the mounting flange 52 so as to mount the snow removing unit 70 to the front of the transmission case 50.

The input shaft 131 of the operation transmission mechanism 130 is disposed in such a manner as to extend upward, concentrically with the crankshaft 61. The upper end of the input shaft 131 is connected to the lower end of the crankshaft 61 via a clutch 65.

The transmission case 50 has an input shaft housing 53 in a tubular shape housing the input shaft 131, and an output shaft housing 54 in a tubular shape formed integrally with the input shaft housing 53, for housing the output shaft 132. The input shaft housing 53 is closed by a lid 55. Reference numerals 141, 142, 143, 144 and 145 denote bearings rotatably supporting the input shaft 131 and the output shaft 132.

Figure 6:
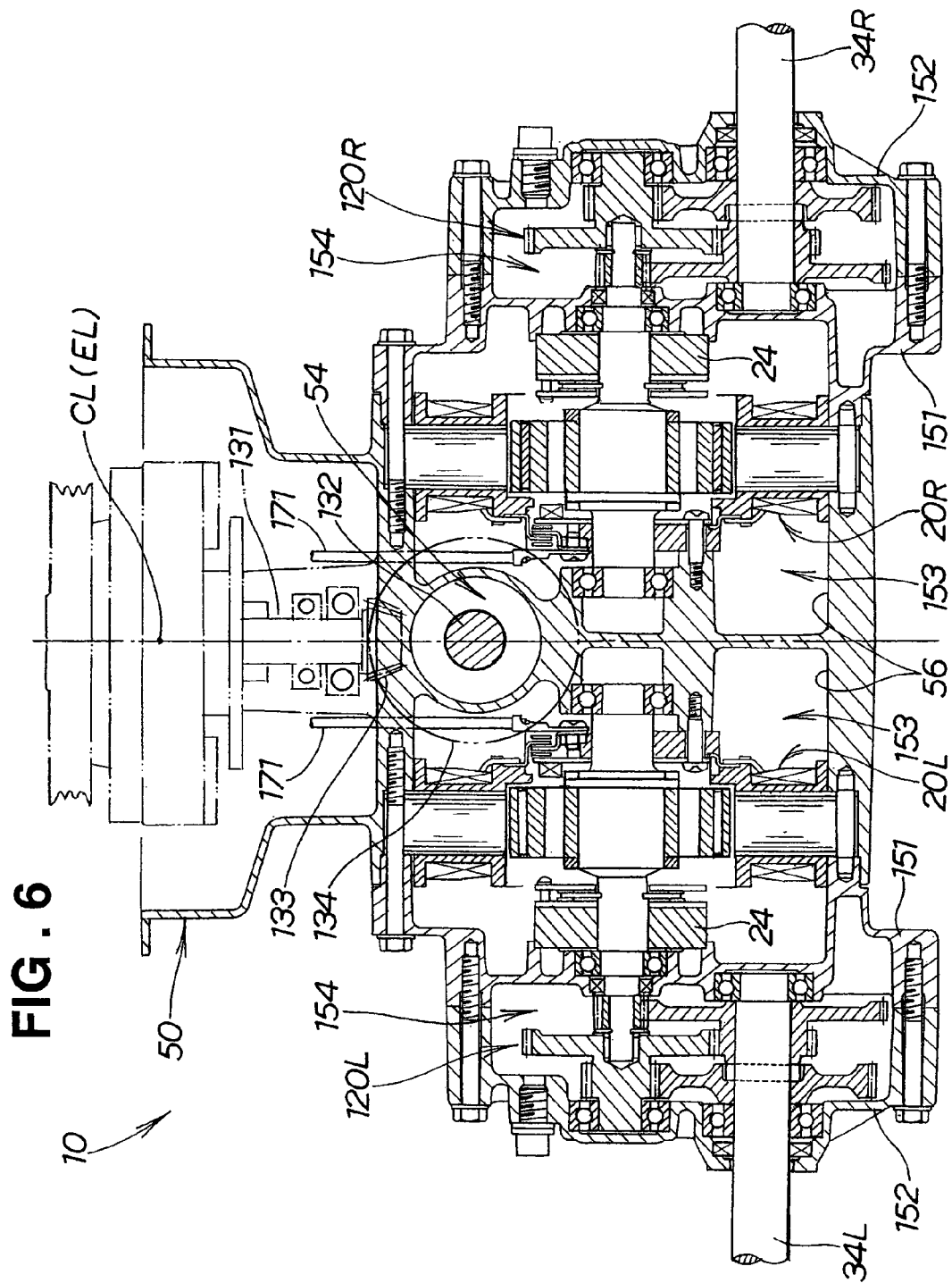
FIG. 6 is a cross-sectional view of the transmission case, the electric motors and travel transmission mechanisms of the snow removing machine equipped with the electric motors according to the present invention.
Figure 7:
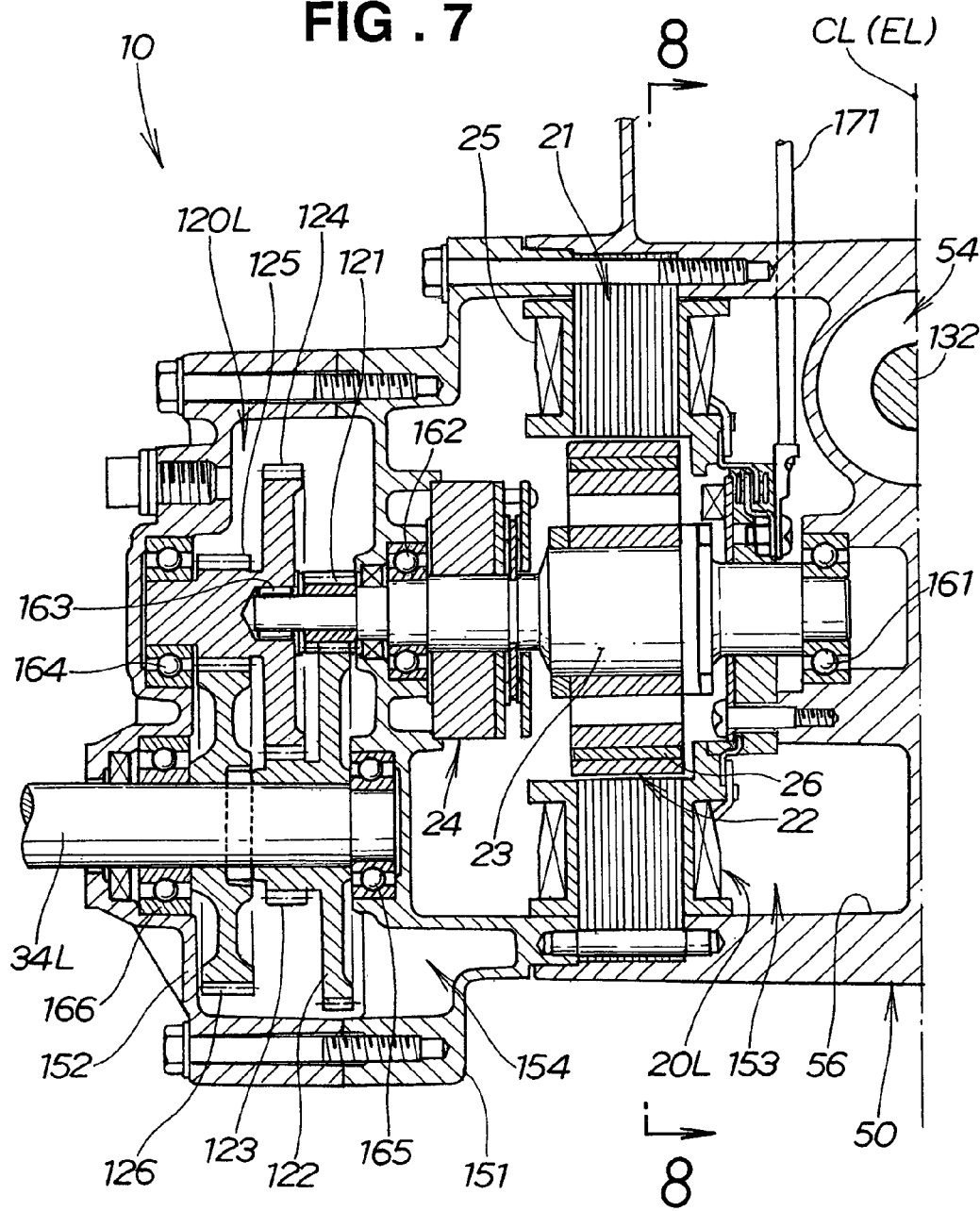
FIG. 7 is a cross-sectional view of the left electric motor and the left travel transmission mechanism shown in FIG. 6.

FIG. 6 shows in section the transmission case 50, the right and left electric motors 20R, 20L, and the right and left travel transmission mechanisms 120R, 120L. FIG. 7 shows the left electric motor 20L and the left travel transmission mechanism 120L. For ease of understanding, the right and left travel transmission mechanisms 120R, 120L are shown in development.

The electric motors 20R, 20L and the travel transmission mechanisms 120R, 120L are housed in the transmission case 50.

As shown in FIGS. 6 and 7, at the right and left sides of the transmission case are provided the right and left electric motors 20R, 20L, the right and left travel transmission mechanisms 120R, 120L, and the right and left drive wheel axles 34R, 34L. The transmission case 50 doubles as part of motor cases (housings) 153, 153.

The transmission case 50 includes the output shaft housing 54 provided along the longitudinal center line CL, motor housings 56, 56 integrally formed at the right and left sides of the output shaft housing 54, right and left motor case halves 151, 151 closing openings of the opened right and left sides of the motor housings 56, 56, and right and left transmission covers 152, 152 fastened by bolts to the right and left sides of the motor case halves 151, 151.

In this manner, the right and left motor housings 56, 56 and the right and left motor case halves 151, 151 constitute the right and left motor cases 153, 153. Thus, the right and left motor housings 56, 56 of the transmission case 50 double as part of the motor cases 153, 153.

Also, the right and left motor case halves 151, 151 and the right and left transmission covers 152, 152 constitute right and left travel transmission mechanism cases 154, 154. Thus, the right and left motor case halves 151, 151 double as part of the travel transmission mechanism cases 154, 154.

The electric motors 20R, 20L and the electromagnetic brakes 24, 24 are housed in the right and left motor cases 153, 153. The right and left travel transmission mechanisms 120R, 120L are housed in the right and left travel transmission mechanism cases 154, 154, respectively.

As shown in FIG. 7, the left electric motor 20L is an inner-rotor-type DC brushless motor of an assembly of the motor shaft 23 extending horizontally in a transverse direction (right and left direction in the figure), the outer stator 21 having a plurality of armatures (coils) 25 arranged in a stator circumferential direction, and the inner rotor 22 having a plurality of permanent magnets 26 arranged in a rotor circumferential direction. The right electric motor 20R has the same configuration.

The motor shaft 23 extending into the left travel transmission mechanism case 154 has the first pinion 121 and the second gear 124 mounted on its distal end. The integrally formed second gear 124 and third pinion 125 are rotatably supported by the transmission cover 152. The motor shaft 23 and the drive wheel axle 34L are rotatably supported by bearings 161, 162, 163, 164, 165 and 166.

Harnesses (conductive wires) 171, 171 for the right and left electric motors 20R, 20L are partially located inside the transmission case 50 doubling as part of the motor cases 153, 153. More specifically, the harnesses 171, 171 connected to the electric motors 20R, 20L in the motor housings 56, 56 are guided to the outside through harness apertures 172 formed in the transmission case 50 as shown in FIG. 5. The harnesses 171, 171 in the transmission case 50 are not exposed to the outside, thus having increased durability at the unexposed portions.

Now, the configuration of the right and left electric motors 20R, 20L shown in FIG. 6 will be described as an "electric motor 20."

Figure 8:
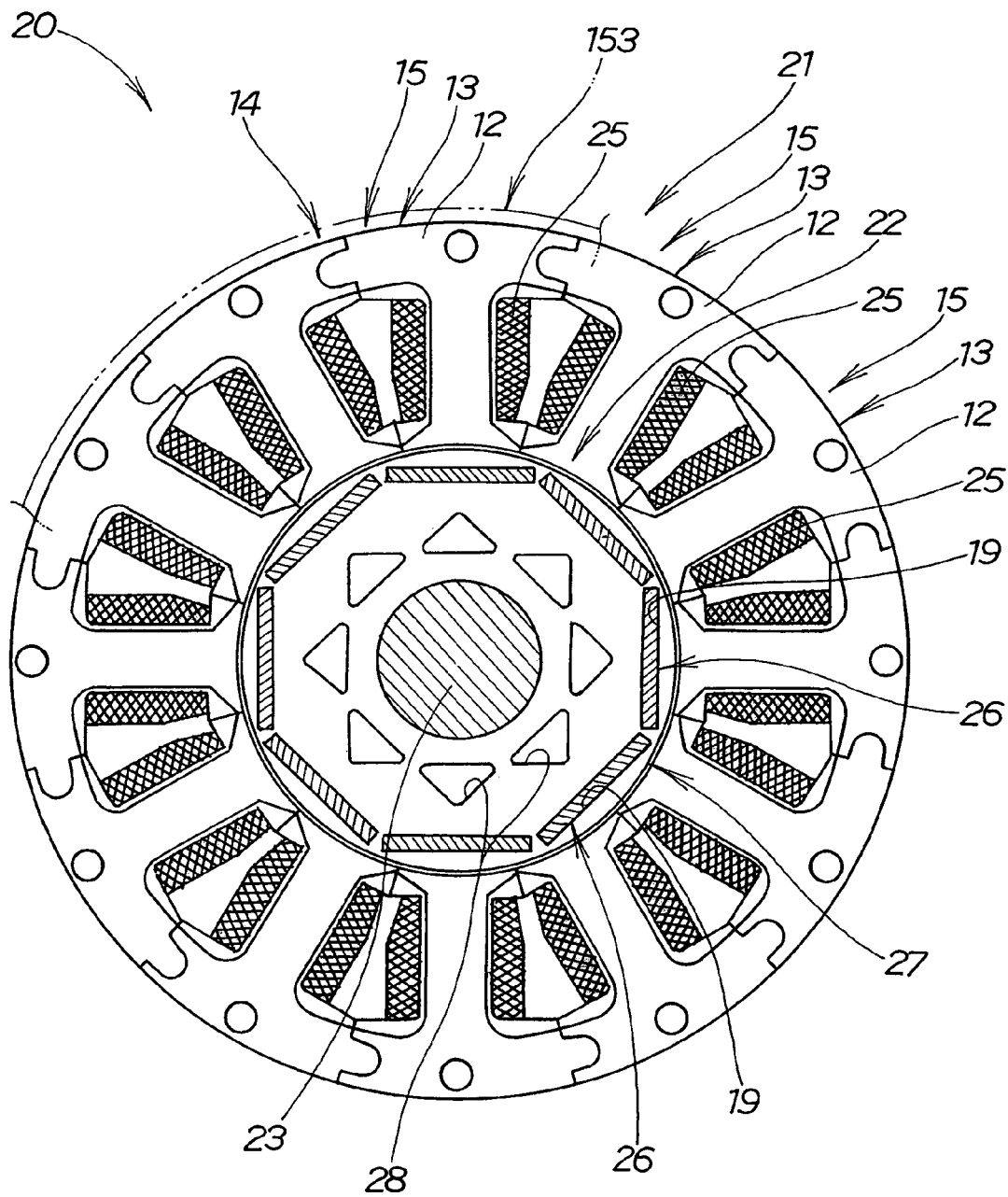
FIG. 8 is a cross-sectional view of the electric motor according to the present invention, taken along line 8—8 of FIG. 7.

FIG. 8 shows a cross section of the electric motor 20 in the present invention shown in FIG. 7.

Referring to FIG. 8, the electric motor 20 includes the outer stator 21 (hereinafter, only referred to as a "stator 21"), the inner rotor 22 rotatably disposed inside the stator 21 (hereinafter, only referred to as a "rotor 22"), and the motor case 153 housing the stator 21 and the rotor 22 (hereinafter, only referred to as a "housing 153").

The stator 21 includes a ring-shaped iron core 14 formed by combined teeth 13, and a plurality of armatures 25 (hereinafter, referred to as "coils 25") wound around the teeth 13, respectively. Each tooth 13 has a substantially T shape, and is constituted by a laminated body of a plurality of iron sheets 12. The teeth 13 and the coils 25 constitute a coil piece 15.

Figure 9:
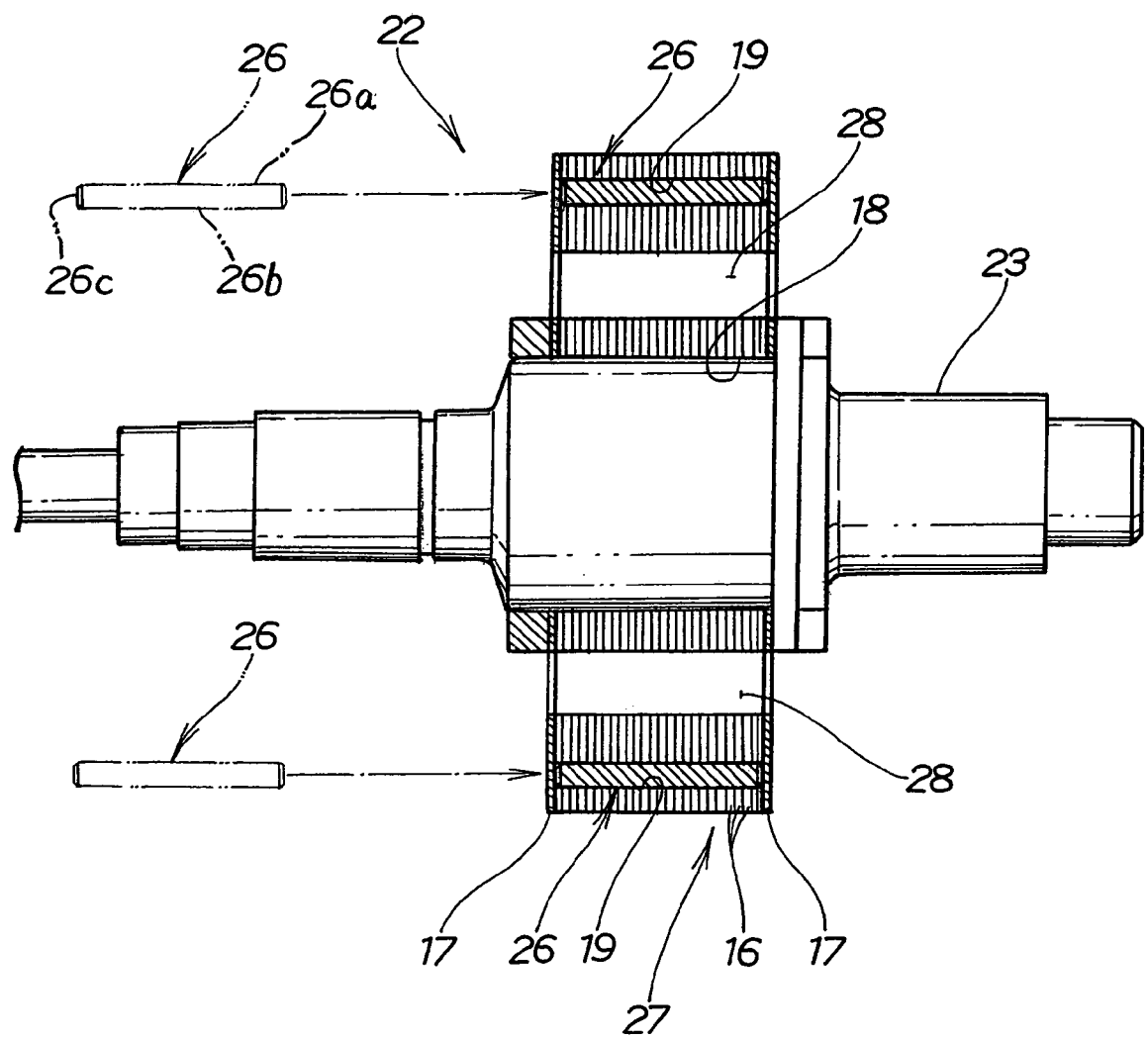
FIG. 9 is a partially cross-sectional view of a rotor shown in FIG. 8.

FIG. 9 shows the rotor 22. The rotor 22 includes the motor shaft 23 (hereinafter referred to as a "rotor shaft 23"), a disc-shaped yoke 27 integrally mounted on the rotor shaft 23, and a plurality of permanent magnets 26 arranged at equal pitches near the periphery of the yoke 27.

The yoke 27 is a laminated member of a plurality of iron sheets 16, 17, 17. The yoke 27 has a shaft hole 18 formed to press fit the rotor shaft 23, a plurality of magnet holes 19 formed to house the permanent magnets 26, respectively, and a plurality of air holes 28 formed to release heat generated from the rotor 22.

The yoke 27 is formed by housing the permanent magnets 26 in the respective magnet holes 19, and then covering the permanent magnets 26 by the iron sheets 17, 17 located at the opposite ends. The iron sheets 16 are formed with the shaft hole 18, the magnet holes 19, and the air holes 28. The iron sheets 17 are formed with the shaft hole 18 and the air holes 28.

Figure 10:
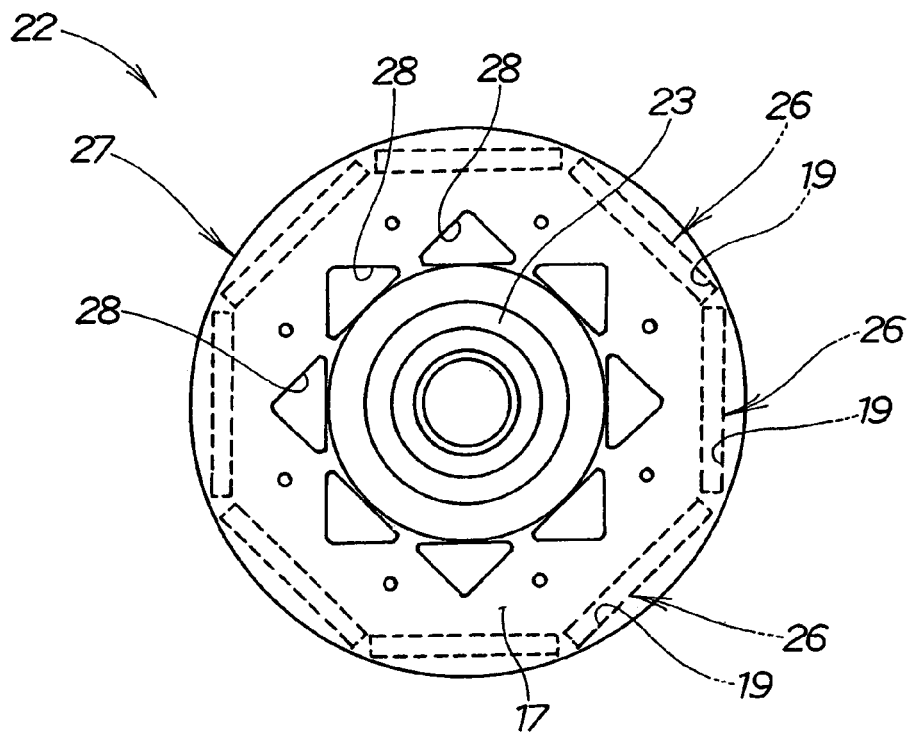
FIG. 10 is a plan view of the rotor shown in FIG. 9.
Figure 11:
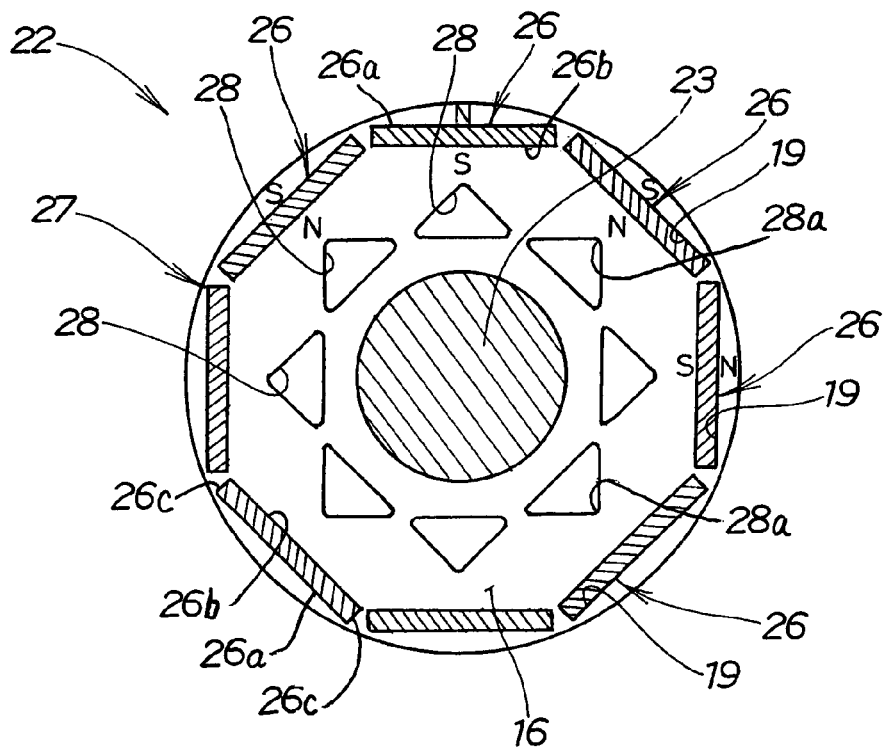
FIG. 11 is a cross-sectional view of the rotor shown in FIG. 10.

As shown in FIGS. 10 and 11, the rotor 22 is comprised of the rotor shaft 23, the disc-shaped yoke 27 integrally mounted on the rotor shaft 23, the magnet holes 19 formed at equal pitches near the periphery of the yoke 27, and the plate-like permanent magnets 26 disposed in the respective magnet holes 19. The yoke 27 has the air holes 28 formed in the region between the rotor shaft 23 and the permanent magnets 26 to accelerate release of heat generated from the rotor 22. The air holes 28 have a contour or shape that includes an angled portion having an apex or tip 28a that points toward a mid-portion of respective inward faces 26b of the permanent magnets 26.

The yoke 27 is thus provided with the air holes 28 for accelerating heat release of the rotor 22 between the rotor shaft 23 and the permanent magnets 26, allowing heat in a central part of the rotor 22 to be directly released, and resulting in acceleration of heat release of the rotor 22.

In addition, the formation of the air holes 28 in the yoke 27 leads to a reduced weight of the rotor 22. As a result, the moment of inertia of the rotor 22 is reduced, and a member supporting the rotor 22 (e.g., the housing 153 shown in FIG. 8) can be reduced in rigidity, resulting in reduction in weight of the electric motor 20.

The permanent magnets 26 have plate-like bodies with one side magnetized as the north pole and the other side as the south pole in a plan view. The permanent magnets 26 are arranged in circumferentially spaced relation from one another about a peripheral portion of the yoke 27 and are arranged in a polygonal shape in such a manner that the north poles and the south poles of the adjacent permanent magnets 26 are alternate. The permanent magnets 26 each have opposed major faces 26a, 26b (FIG. 11) interconnected by sides 26c and are disposed in side-by-side equidstantly-spaced relation so that the inward faces 26b of the permanent magnets 26 face the rotor shaft 23.

Figure 12:
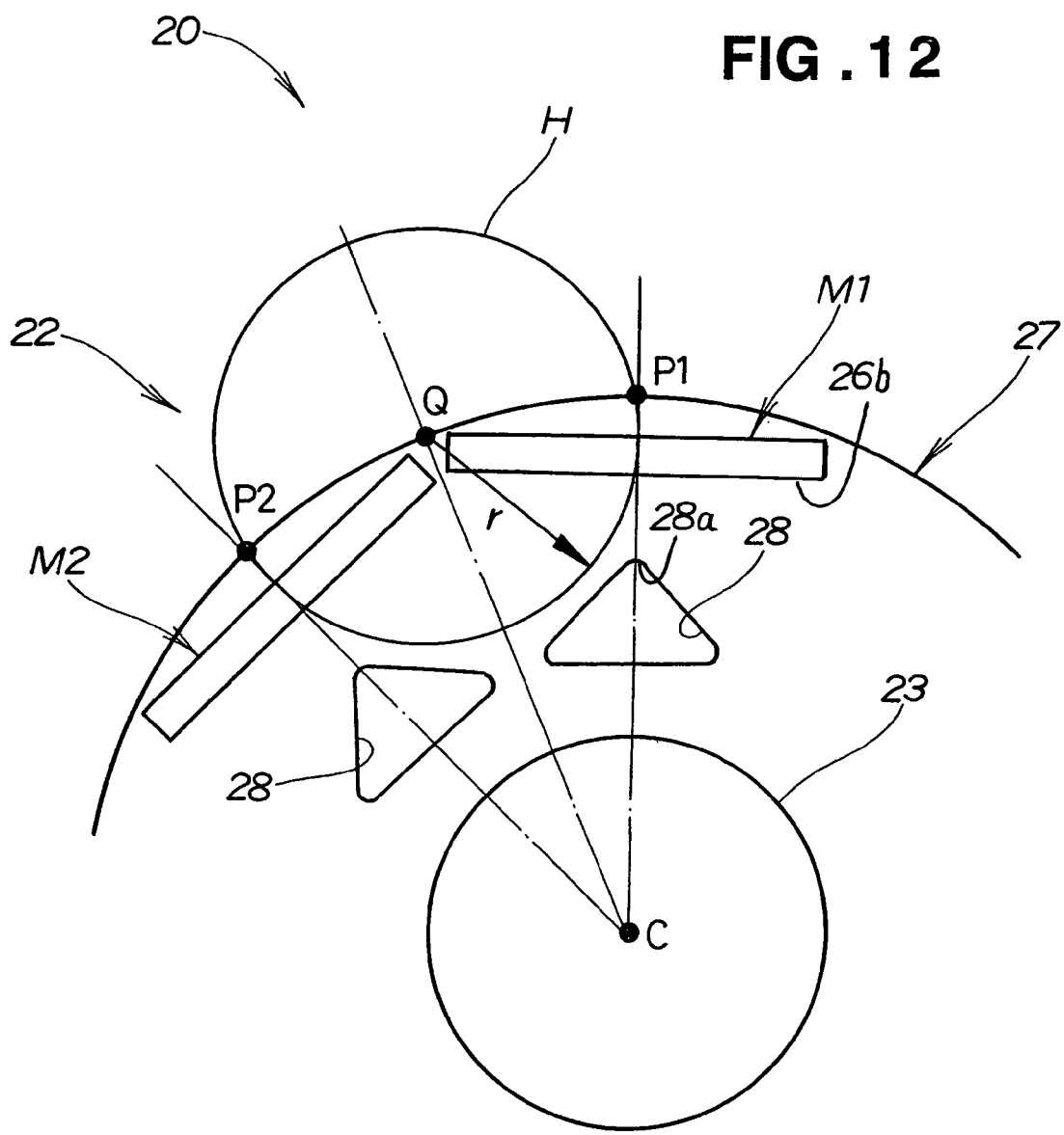
FIG. 12 is a diagram illustrating the locations of air holes formed in a yoke of the rotor shown in FIG. 11.

FIG. 12 is a diagram illustrating the formed locations of the air holes 28 shown in FIG. 11.

In FIG. 12, the center of the rotor shaft 23 is indicated at C, one of the permanent magnets 26 (see FIG. 11) at M1, a point of intersection of a perpendicular line drawn from the center C to the permanent magnet M1 and the periphery of the yoke 27 at P1, a permanent magnet adjacent to the permanent magnet M1 at M2, a point of intersection of a perpendicular line drawn from the center C to the permanent magnet M2 and the periphery of the yoke 27 at P2, and a point of intersection where a radial line passing through the center C and a midpoint between the adjacent permanent magnets M1, M2 intersects with the periphery of the yoke 27 at Q. With this, when a circle H of a radius r passing through the intersection point P1 or P2 is drawn around the intersection point Q, the air holes 28 are formed in locations outside of the circle H.

Figure 13A:
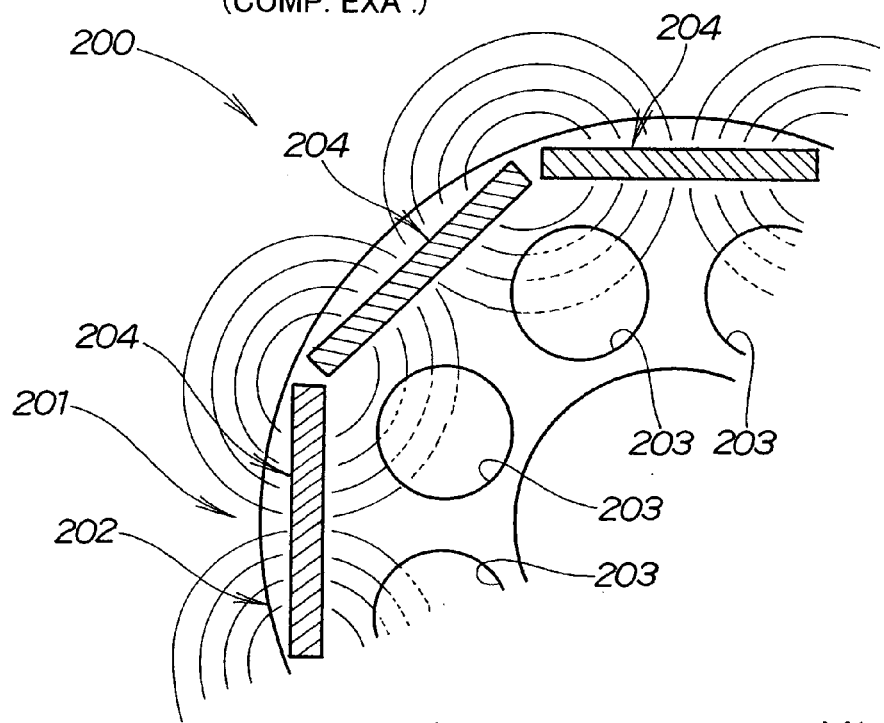
FIGS. 13A and 13B are diagrams illustrating a comparative example and an embodiment, illustrating the relationship between air holes formed in a yoke and magnetic flux.
Figure 13B:
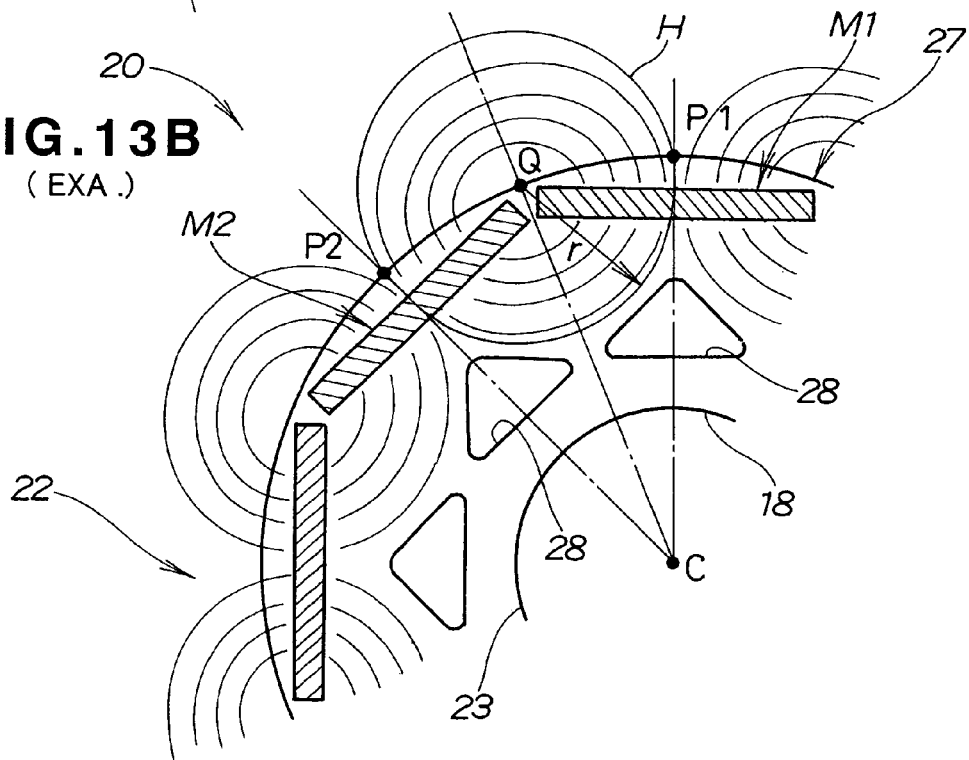

FIGS. 13A and 13B show a comparative example and the present embodiment, illustrating the relationship between magnetic flux passing through a yoke and air holes. In this embodiment, the apexes 28a of the air hole contours lie along the lines passing through the center C and the points P1, P2 and the apexes 28a point toward the mid-portion of the inward faces 26b of the permanent magnets M1, M2.

An electric motor 200 in the comparative example shown in FIG. 13A is an example in which when a plurality of air holes 203 are provided in a yoke 202 of a rotor 201, the air holes 203 are provided radially between adjacent permanent magnets 204, 204, respectively. Magnetic flux shown in thin lines is interrupted by the air holes 203, and magnetic flux density is reduced.

In the electric motor 20 in this embodiment shown in FIG. 13B, the air holes 28 are provided outside of the circle H of the radius r passing through the intersection point P1 or P2 with its center at the intersection point Q, so that magnetic flux produced between the permanent magnets M1, M2 does not pass through the air holes 28, and magnetic paths are ensured. As a result, magnetic flux shown in thin lines is not interrupted, resulting in prevention of reduction in magnetic flux density even with the provision of the air holes 28.

Further, in this embodiment, since the air holes 28 are formed on perpendicular lines from the center C of the rotor shaft 23 to the plate-like permanent magnets M1, M2, and so on, circumferentially of the rotor shaft 23, unnecessary magnetic flux such as magnetic flux passing through the rotor shaft 23 can be interrupted.

Furthermore, in this embodiment, in the yoke 27 of the rotor 22, the distance between the shaft hole 18 and the air holes 28 is set at a distance which allows the rigidity of the yoke 27 to be sufficiently maintained.

Figure 14A:
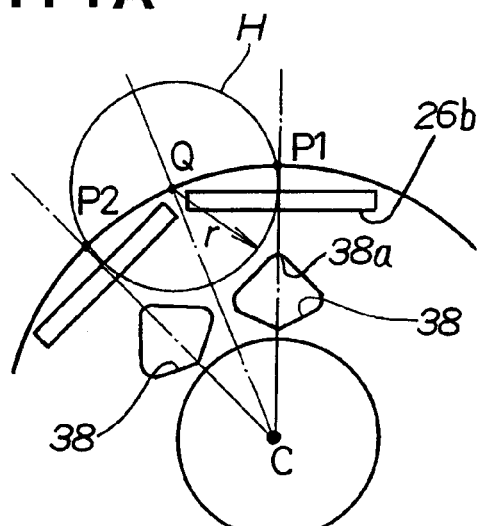
FIGS. 14A to 14C are diagrams illustrating modifications of the air holes.
Figure 14B:
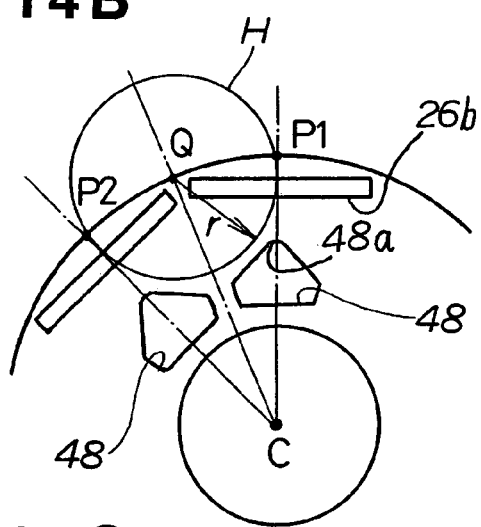
Figure 14C:
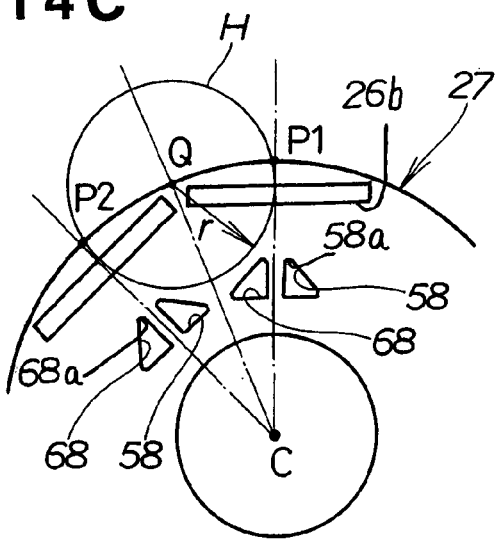
Figure 15:
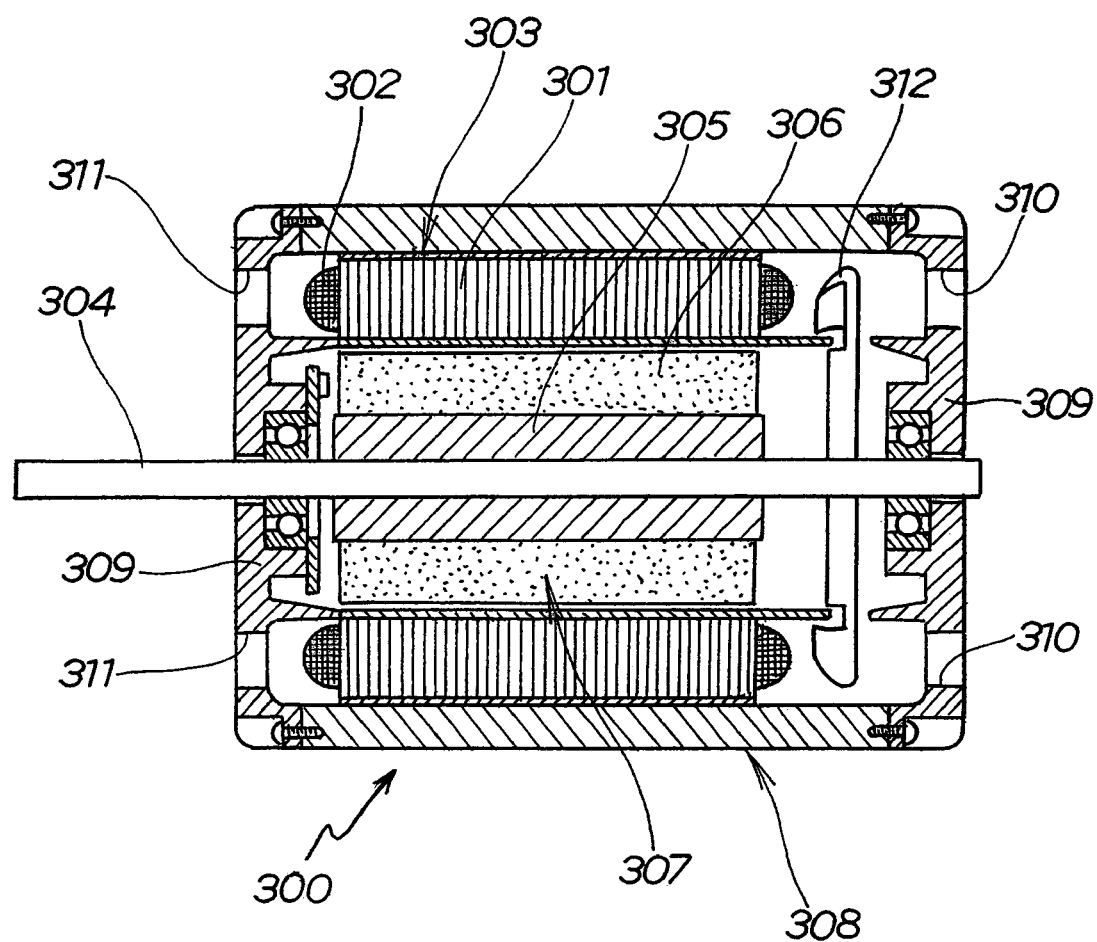
FIG. 15 is a cross-sectional view illustrating the basic configuration of a conventional electric motor.

FIGS. 14A, 14B and 14C show first, second and third modifications in which the shape of air holes formed in a rotor in this embodiment is modified.

Air holes 38 in the first modification shown in FIG. 14A are deformed squares, and the apexes 38a of the air hole contours lie along lines passing through the center C and the points P1, P2. The air holes 38 can thus be formed large, resulting in acceleration of heat release.

Air holes 48 in the second modification shown in FIG. 14B have a pentagonal shape, and the apexes 48a of the air hole contours lie along lines passing through the center C and the points P1, P2. The air holes 48 can thus be formed large, resulting in acceleration of heat release, like the air holes 38 shown in FIG. 14A.

Air holes in the third modification shown in FIG. 14C are exemplarily shown as pairs of symmetrical air holes 58, 68 formed in a triangular shape, each pair of air holes being associated with one permanent magnet. The apexes 58a, 68a of the air hole contours of each pair of air holes 58, 68 lie on opposite sides of lines passing through the center C and the points P1, P2. Consequently, rigidity is also provided between each pair of air holes 58, 68, and the rigidity of the yoke 27 can be sufficiently maintained.

The electric motor shown in this embodiment is an inner-rotor-type electric motor as shown in FIG. 8, but is not limited thereto, and may be an inner-rotor-type generator or an inner-rotor-type generator/motor.

In the electric motor shown in this embodiment, the magnet holes 19 are provided in the yoke 27 as shown in FIG. 11, which is not limiting. Alternatively, magnet holes may be notches or the like.

Also, this embodiment has been described with the example in which the teeth 13 are arranged in a ring shape to constitute the iron core 14 as shown in FIG. 8, but the present invention is not limited thereto. It may alternatively be possible to wind a plurality of coils around an integrated ring-shaped iron core.

Obviously, various minor changes and modifications of the present invention are possible in the light of the above teaching. It is therefore to be understood that within the scope of the appended claims the invention may be practiced otherwise than as specifically described.

What is claimed is:

1. An electric motor comprising a stator with a plurality of coils wound around a ring-shaped iron core; and a rotor rotatably disposed inside the stator, the rotor comprising a rotor shaft, a yoke integrally mounted on the rotor shaft, a plurality of magnet holes formed at equal pitches near a periphery of the yoke, and a plurality of plate-like permanent magnets disposed in respective ones of the magnet holes, wherein the yoke has a plurality of air holes, equal in number to the number of permanent magnets and provided between the rotor shaft and the permanent magnets, for accelerating heat release of the rotor; and wherein with a center of the rotor shaft as C, one of each two adjacent permanent magnets as M1, a point of intersection of a perpendicular line-drawn from the center C to the permanent magnet M1 and the periphery of the yoke as P1, a permanent magnet adjacent to the permanent magnet M1 as M2, a point of intersection of a perpendicular line drawn from the center C to the permanent magnet M2 and the periphery of the yoke as P2, and a point of intersection where a radial line passing through the center C and a midpoint between the adjacent permanent magnets M1, M2 intersects with the periphery of the yoke as Q, when a circle of a radius r passing through the intersection point P1 and the intersection point P2 is drawn around the intersection point Q, the air holes lie outside of the circle in symmetric relation relative to respective ones of the perpendicular lines.

2. An electric motor according to claim 1; wherein the air holes each have a contour having an angled portion having an apex that points toward a mid-portion of a respective one of the permanent magnets.

3. An electric motor according to claim 2; wherein the apex of each air hole contour lies on a respective one of the perpendicular lines.

4. An electric motor comprising:
a stator with a plurality of coils wound around a ring-shaped iron core; and
a rotor rotatably disposed inside the stator, the rotor comprising a rotor shaft, a yoke integrally mounted on the rotor shaft, a plurality of magnet holes formed at equal pitches near a periphery of the yoke, and a plurality of plate-like permanent magnets disposed in respective ones of the magnet holes;
wherein the yoke has a plurality of air holes, two associated with each permanent magnet and provided between the rotor shaft and the permanent magnets, for accelerating heat release of the rotor; and
wherein with a center of the rotor shaft as C, one of each two adjacent permanent magnets as M1, a point of intersection of a perpendicular line drawn from the center C to the permanent magnet M1 and the periphery of the yoke as P1, a permanent magnet adjacent to the permanent magnet M1 as M2, a point of intersection of a perpendicular line drawn from the center C to the permanent magnet M2 and the periphery of the yoke as P2, and a point of intersection where a radial line passing through the center C and a midpoint between the adjacent permanent magnets M1, M2 intersects with the periphery of the yoke as Q, when a circle of a radius r passing through the intersection point P1 and/or the intersection point P2 is drawn around the intersection point Q, the air holes lie outside of the circle with the two air holes associated with each permanent magnet in symmetric relation relative to the permanent magnet.

5. An electric motor according to claim 4; wherein the two air holes associated with each permanent magnet each have a contour having an angled portion having an apex that points toward a mid-portion of the permanent magnet.

6. An electric motor according to claim 5; wherein the two air holes associated with each permanent magnet are disposed on opposite sides of a respective one of the perpendicular lines.

7. An electric motor comprising: a stator having a ring-shaped core on which are wound a plurality of coils; and a rotor rotatably disposed within the ring-shaped core, the rotor comprising a rotor shaft, a yoke connected to the rotor shaft, and a plurality of plate-like permanent magnets connected to the yoke and circumferentially spaced from one another about a peripheral portion of the yoke, the permanent magnets each having opposed faces interconnected by sides and being disposed in side-by-side equidistantly-spaced relation so that an inward face of each permanent magnet faces the rotor shaft, the yoke having a plurality of air holes circumferentially spaced from one another in a region between the rotor shaft and the permanent magnets, the air holes each having a contour which includes an angled portion having an apex that points toward a mid-portion of one of the inward faces of the permanent magnets.

8. An electric motor according to claim 7; wherein the number of air holes is the same as the number of permanent magnets, and the apexes of the air hole contours lie on respective imaginary lines that pass through the center of the rotor shaft and are perpendicular to the inward faces of respective ones of the permanent magnets.

9. An electric motor according to claim 7; wherein there are two air holes associated with each permanent magnet, and the apexes of the air hole contours of the two air holes lie on opposite sides of an imaginary line that passes through the center of the rotor shaft and is perpendicular to the inward face of the associated permanent magnet.

* * * * *